Dec. 8, 1970 G. H. PORATH ETAL 3,545,310
ADAPTIVE MACHINE TOOL CONTROL SYSTEM
Filed June 14, 1968 4 Sheets-Sheet 1

INVENTORS
GORDON H. PORATH, PHILIP J. ROSEN
& MYRON L. GREENBERG
BY
Barnes, Kisselle, Raisch & Choate
ATTORNEYS 3,545,310
Patented Dec. 8, 1970

3,545,310
ADAPTIVE MACHINE TOOL CONTROL SYSTEM
Gordon H. Porath, Brighton Livingstone County, Philip
J. Rosen, Oak Park, and Myron L. Greenberg, Union
Lake, Mich., assignors to The Babcock & Wilcox Company, New York, N.Y., a corporation of New Jersey
Filed June 14, 1968, Ser. No. 737,217
Int. Cl. B23b 47/24
U.S. Cl. 77—32.7
49 Claims

ABSTRACT OF THE DISCLOSURE

A machine control system wherein a tool on a tool support is movable toward and away from the workpiece and the torque on the tool is measured and continuously compared with the instantaneous value of no-load torque on the device that moves the tool and a warning signal is produced in the event that the torque differential exceeds a predetermined value. Means are also provided for comparing the rate of change of torque on the tool with a predetermined standard and producing a warning signal if the standard is exceeded.

---

This invention relates to machine tool systems and particularly to an adaptive machine tool control system. The term "adaptive" as used in control systems refers to a system which modifies a control criterion on the basis of continual or periodic monitoring of one or more output signals from the system as a whole.

One of the major problems associated with machine tools and particularly automatic production lines utilizing machine tools is the maintenance of the cutting tools at an adequate sharpness level such as to insure that there is minimum tool breakage so that the production line will operate at maximum speed. If all the machining operations were exactly identical and performed with identical tooling, then a mass sharpening effort could be instituted at regular time intervals. Since this is not the case, it is necessary to utilize tool sharpness indicators to determine the cutting ability of each tool. Common indicators comprise devices that sense the motor current or the thrust on the slide unit and read out on a meter relay with a single set point. The disadvantage of this type of device is that the motor current or the slide thrust can exhibit large variations due to a change in environmental conditions while the tool is operating normally. In addition, it is possible that due to abnormal conditions with respect to the tools or the workpiece, the damage to the workpiece or the tooling may have already occurred before it is sensed.

If damage is done to the work support such as a spindle, then obviously it requires reworking or rebuilding. Because of this required reworking or rebuilding, there has been a reluctance to use hydrostatic tool supports or spindles which are more difficult to repair and of which there is usually no spare available.

Among the objects of the invention are to provide a control system which will measure the difference in cutting torque or load between the full load value with a tool in contact with the work and the no-load value with the tool out of contact with the work; compare it with a standard and produce a warning signal; and which will measure the change in torque or load per unit time as the tool makes contact with the work, compare it with a standard and produce a warning signal.

Figure 1:
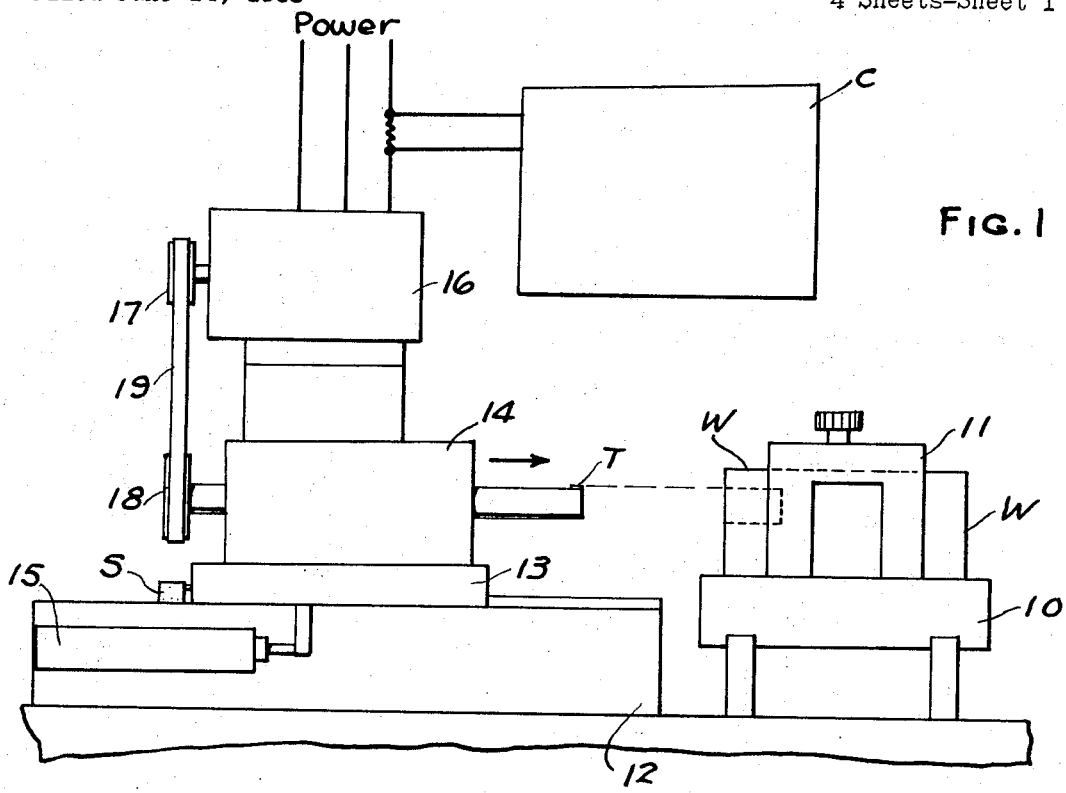
FIG. 1 is a diagrammatic view of a tool control system embodying the invention.

Referring to FIG. 1, the machine tool control system comprises a pallet 10 movable along a transfer system and supporting a workpiece W held by a fixture 11. At any particular station, a machine tool comprising a base 12 which supports a slide 13 is provided. A rotary spindle 14 that supports a tool is movable along the slide 13 by a cylinder 15. The spindle is driven by an electric motor 16 through pulleys 17, 18 and a belt 19. The spindle 14 is supported on the slide by hydrostatic bearings such as shown in the patent to Gordon H. Porath 3,231,319, and the spindle is of the hydrostatic type such as shown in the patents to Gordon H. Porath 3,200,671 or 3,223,463.

A controller C is associated with the motor 16 and is operable to monitor the electric power to the motor and thereby measure the torque in a manner presently described to produce a warning signal or a retraction signal for retracting of the spindle.

Of course, the use of a pallet transfer as the basic machine tool in this system is by way of example only. A stationary single-operation machine with several moving heads and a stationary, hand load fixture can be used, as can a dial index machine, trunnion machine, shuttle type boring machine, etc. Similarly the slide can be advanced by a lead screw, rack and pinion, ball screw or any other actuator, or, indeed, a quill could be used instead of a separate slide and spindle. Nor need the bearings be hydrostatic. None of these things are essential to the invention, which is concerned with control and indication. Finally, it will be understood that the features of any of the following embodiments of the invention can be combined, if the application warrants it.

Figure 2:
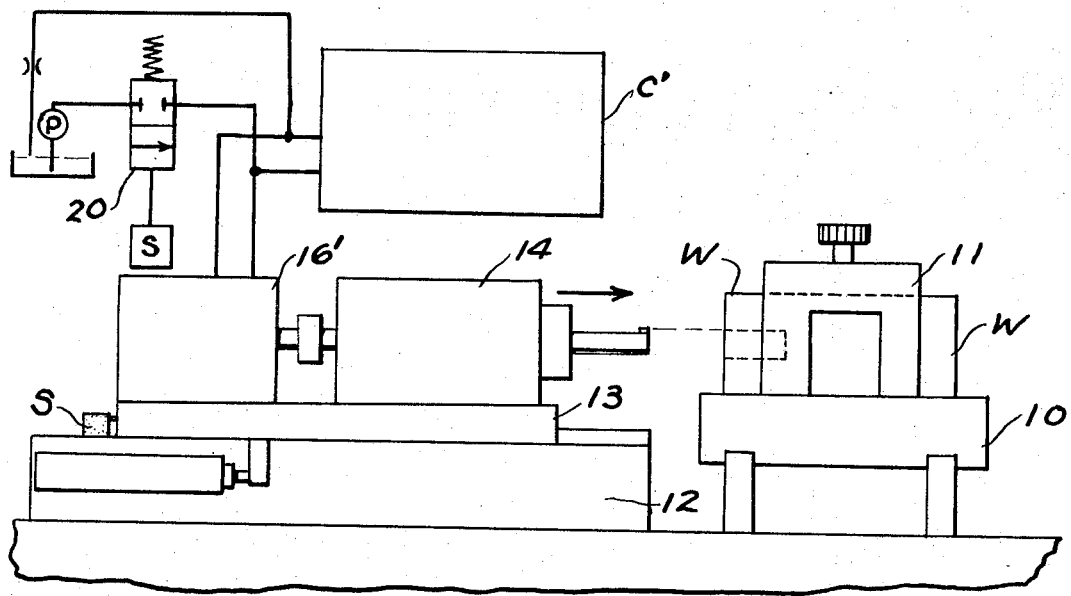
FIG. 2 is a digrammatic view of a modified form of tool control system embodying the invention.

In the modified form shown in FIG. 2, the slide 13′ is supported on a base 12 and supports a hydrostatic spindle 14′ that is driven by a hydraulic motor 16′ which is operated under the control of a valve 20. As in the previous form of the invention, controller C′ monitors the fluid differential pressure to and from the hydraulic motor 16′ to measure the torque and produce a warning signal or retraction of the spindle 14′, as presently described.

Figure 3:
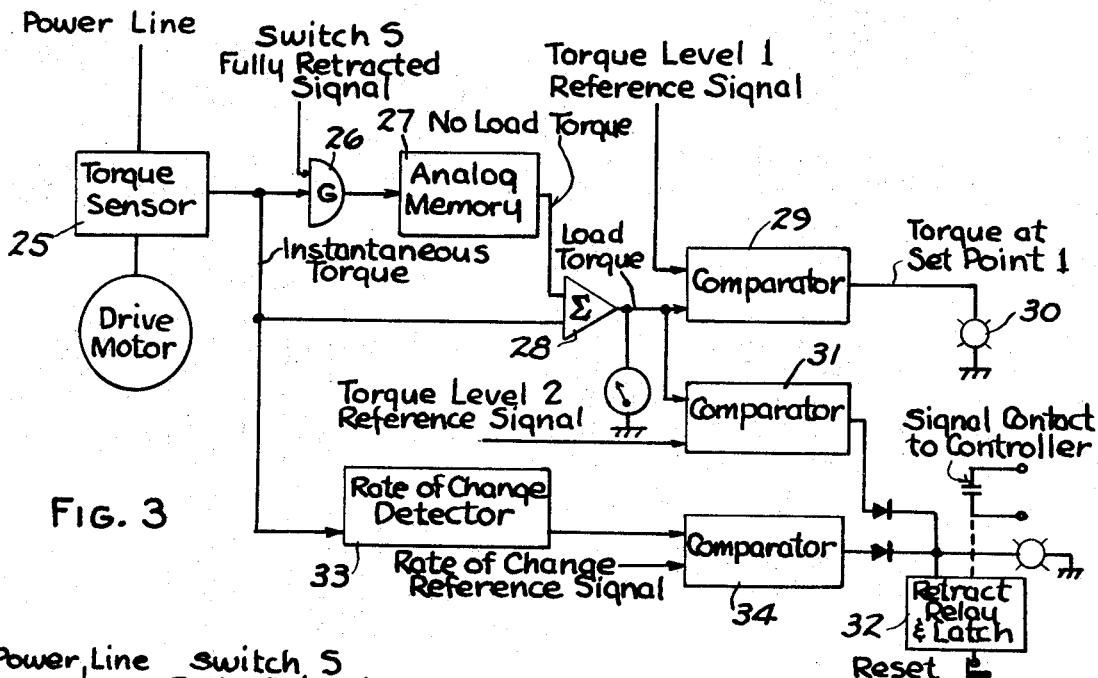
FIG. 3 is a diagrammatic view of one form of controller used in the system.

One type of controller is shown in FIG. 3, wherein the torque on the motor 16 or 16′ is sensed by a sensor 25 to produce a signal that corresponds to the torque on the motor. In the case of the electrical motor 16 in FIG. 1, the sensor may comprise a current transformer, bridge circuit and voltage standardizing network. In the case of the hydraulic motor 16′ in FIG. 2, the sensor may comprise a pressure transducer. The sensor thus produces an instantaneous signal corresponding to the torque or load on the tool T which is a direct measure of the torque or load on the motor.

The output from the torque sensor 25 is directed to an AND gate 26. When the slide 13 or 13′ is retracted, a switch S is activated to permit the no-load torque signal to pass through the AND gate 26 and register on an analog memory 27. As the tool moves inwardly into contact with the workpiece and engages the workpiece, the load on the tool will increase causing an increased output signal from the torque sensor 25. The instantaneous torque signal and the no-load torque signal are subtracted in an algebraic summer 28. The output of the summer 28 is compared in a comparator 29 with a first reference signal. If the output of the summer 28 exceeds the setting of the first reference signal, a warning signal is produced which energizes a warning light 30.

The output of the summer 28 is also compared in a comparator 31 with a second reference signal of greater magnitude and if the output of the summer is greater than the second reference signal, a second control signal is produced which energizes a retract relay 32 to actuate the cylinder 15 returning the slide to its original position with the tool out of contact with the workpiece.

The instantaneous torque load signal is also directed to a rate of change detector 33 which produces an augmented rate of change signal that is compared in a comparator 34 with a rate of change reference signal. If the magnitude of the rate of change signal exceeds the magnitude of the rate of change reference signal, a third control signal is produced that energizes retract relay 32 to retract the tool.

Figure 4:
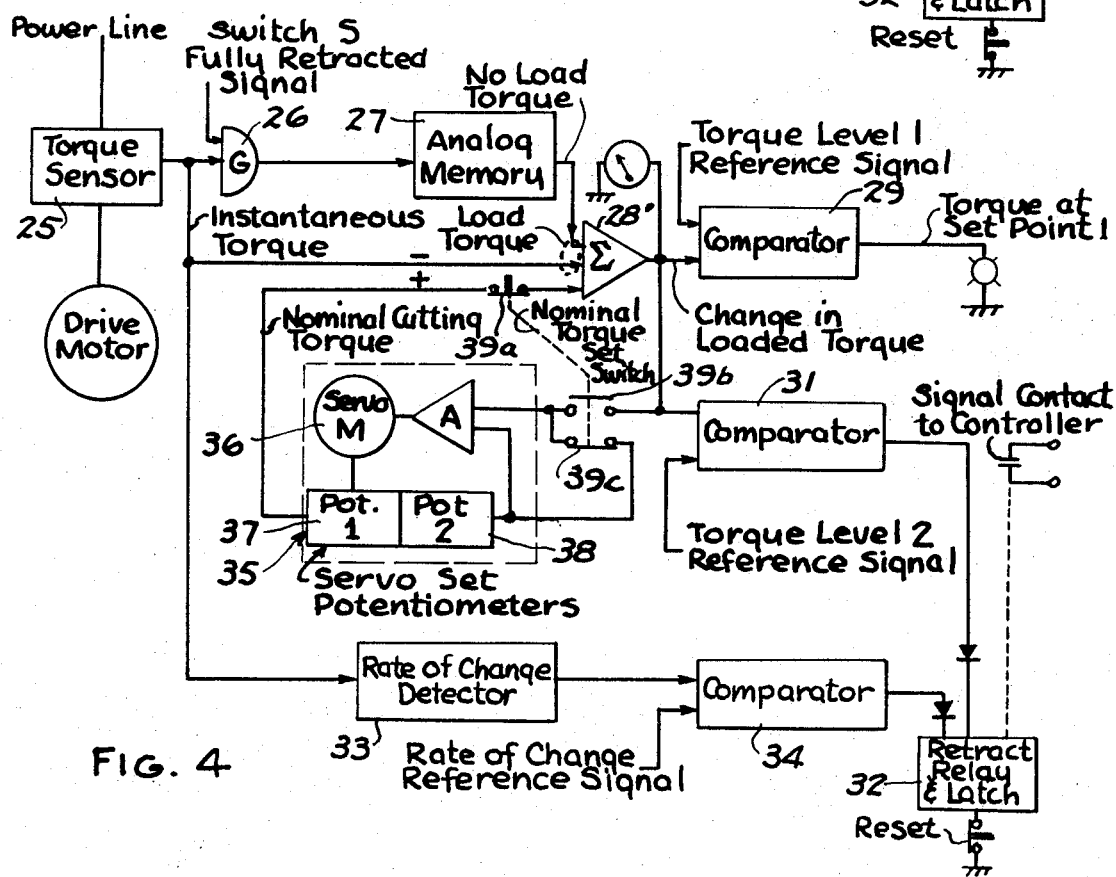
FIG. 4 is a diagrammatic view of another form of controller.

In another form of controller shown in FIG. 4, in which similar reference numerals are used to illustrate analogous functions, a system is provided which refers the signal comparison to the nominal cutting load, a preset level of torque corresponding to a sharp tool and a workpiece of normal composition, rather than to the no-load condition. This is intended to increase the scale available for overload discrimination, since a larger part of the total signal is subtracted out initially by this method.

A signal corresponding to the present value of no-load torque from the sensor 25 is stored in the analog memory 27 prior to each cycle as before by way of AND gate 26. In addition, at such time as a signal representative of the nominal or desired normal load condition may be expected to be available from the sensor; such as immediately after a tool change and/or immediately after the introduction of a new batch of workpieces or after some other change in the basic conditions of operation, the servo set potentiometer assembly 35 is set to this nominal value of load torque, in the following way: The nominal torque setting switch 39, is actuated during cutting, opening contacts 39a and 39c and closing contact 39b. Opening contact 39a removes the output signal of pot 37 from the summing amplifier 28 input. Opening contact 39c removes the output of follow-up pot 38 from the servo set pot amplifier A, permitting the settings of pots 37 and 38 to be altered. Closing contact 39b connects the output of summing amplifier 28 to the servo set pot input. This causes the servo consisting of amplifier A and servo motor 36 to null at a new value such that the outputs of pots 37 and 38 are equal to the output of amplifier 28. It will be clear that, if this operation is done while the newly sharpened tool is cutting a representative workpiece, the servo set pots will store a value equal to the nominal cutting load—that is, to the total torque output less the no-load torque (from analog memory 27). This completes the presetting operation. Switch 39 is now released, closing contacts 39a and 39c and opening contact 39b. The latter actions lock the servo set potentiometers to their present reading. The former feeds the stored output of nominal cutting torque to the summing amplifier 28.

Amplifier 28, on subsequent cycles will then subtract nominal cutting torque+no-load torque from total torque, thus producing a signal corresponding to excess of actual torque over the nominal value of total torque (it is obvious that nominal cutting torque+no-load torque=nominal total torque). The latter signal is compared to dull-tool load and catastrophic load reference signals in comparators 29 and 31 respectively as before. The rate of change signal is generated in detector 33 and operated on comparator 34 as before. The cycle is controlled by comparators 31 and 34 as before. Switch 39 may be so arranged as to be latched closed during a predetermined portion of the test cycle and not thereafter rather than being directly closed at an operator's discretion.

Figure 5:
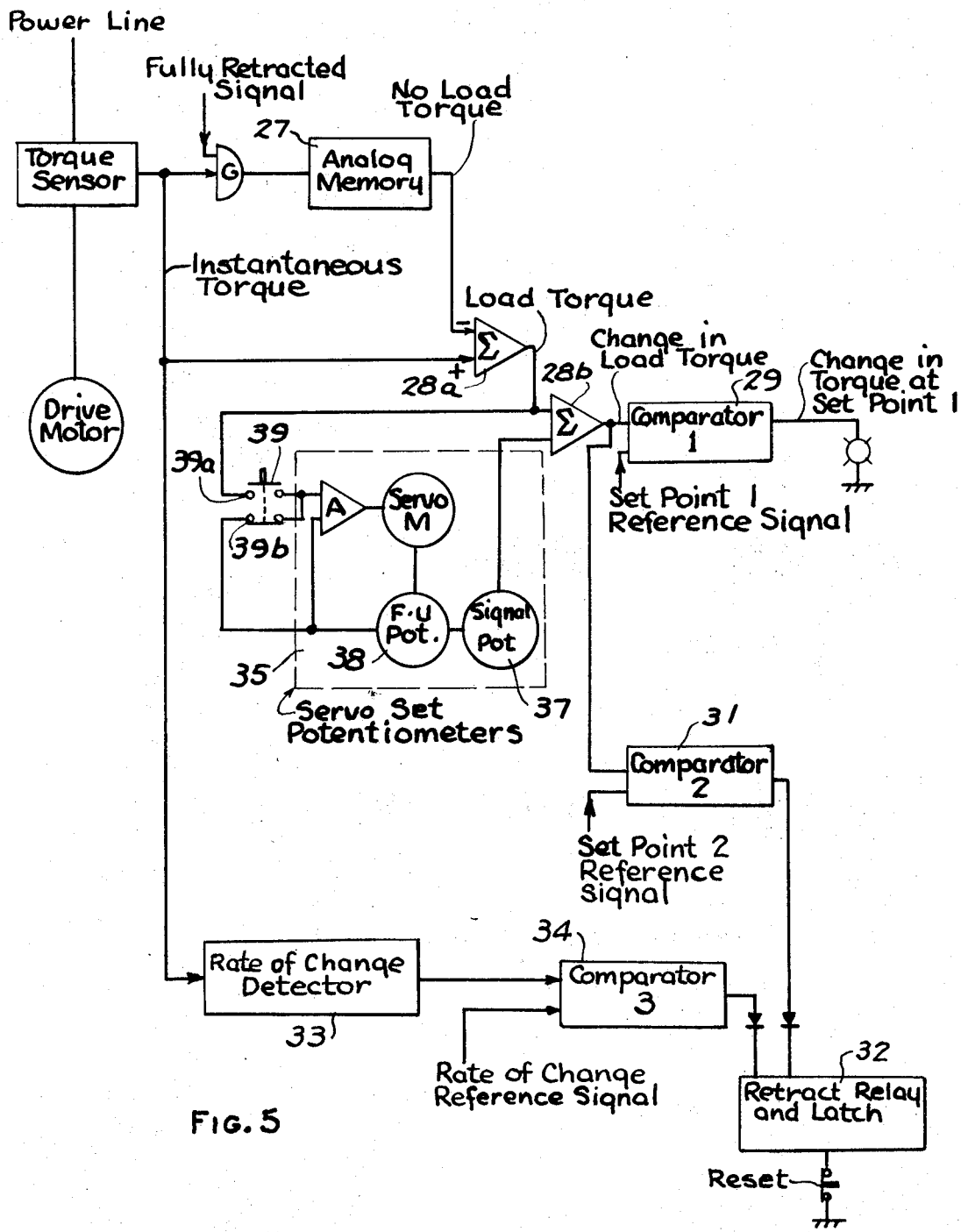
FIG. 5 is a diagrammatic view of another form of controller.

In the embodiment shown in FIG. 5, still using similar reference numbers for analogous elements, the functions of summing amplifier 28 have been split between amplifiers 28a and 28b. The object here is to make available signals corresponding to both actual cutting load and change in cutting load. The system operates as follows: Amplifier 28a always produces a signal corresponding to actual cutting torque, that is total torque less no-load torque. This signal is available via contact 39a of switch 39, when switch 39 is actuated for setting the servo set pot 35. Contact 39b locks the setting (as above) when switch 39 is not actuated. Amplifier 28b then subtracts the nominal cutting torque (from servo pot 37) from the actual cutting torque, producing change in load torque as above. The remainder of the systems are identical. Note that if an explicit value of actual cutting torque is needed for some other function, it is available from amplifier 28a, unlike the situation in the embodiment of FIG. 4.

Figure 6:
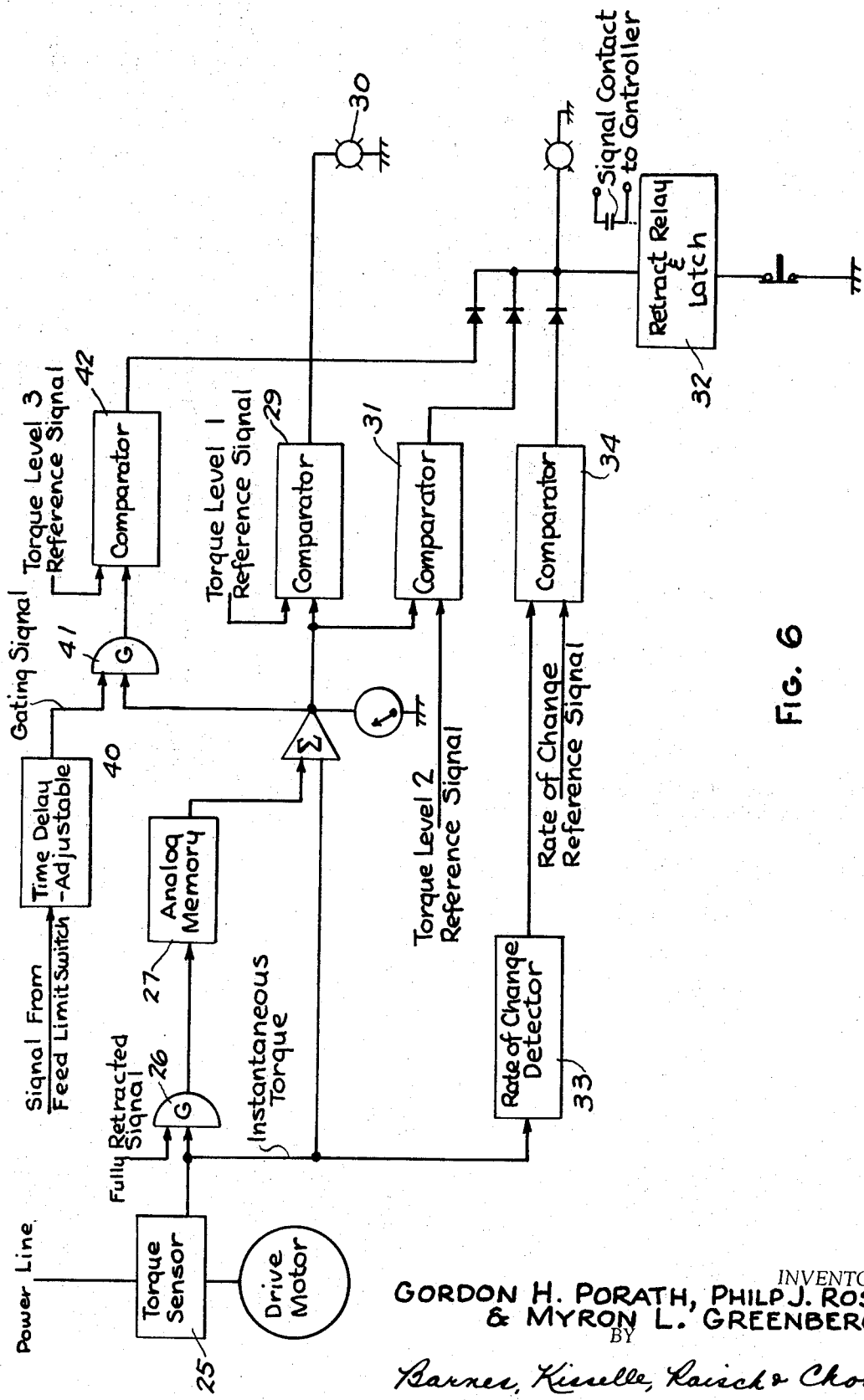
FIG. 6 is a diagrammatic view of another form of controller.

A further embodiment of the invention is shown in FIG. 6, which is intended for use in situations in which too little torque is as deleterious to effective cutting as is too much torque. This condition can occur in finish boring, in which tool cratering or some similar phenomenon causes the tool to slide freely over the workpiece surface instead of cutting properly. The system as shown is identical to that of FIG. 3, except for one branch. In this branch, a signal is taken from the feed limit switch on the machine and fed to time delay 40. This limit switch is actuated only when the slide unit or similar feed device has advanced beyond the rapid travel range at the beginning of a feed stroke and has begun the slow feed necessary for finish boring of the part. (The switch does not actuate on the return stroke.) Time delay 40 now operates to delay the transmission of the signal for a long enough time to insure that the tool has actually entered the work and has started removing material. At the expiration of this delay, the gate 41 is operated and the load torque signal from amplifier 28 is fed through gate 41 to comparator 42, where it is compared with a reference signal. The operation of comparator 42 is opposite in sense to that of the other comparators, 29, 31 and 34, since it must produce an output signal to the retract relay 32 when the load torque signal is less than rather than greater than reference signal 3.

What is claimed is:
1. In a machine tool wherein a tool support is movable relative to a workpiece to perform work on the workpiece, the combination comprising
means for moving the tool support relative to the workpiece,
means responsive to the load on the tool for producing a signal corresponding in magnitude to the no-load condition when the tool is out of contact with the workpiece,
means responsive to the load on the tool for producing a signal corresponding in magnitude to the load on the tool when the tool is in contact with the workpiece,
means responsive to said first and second mentioned signal producing means for producing a net signal equal to the difference between said load signal and said no-load signal,
means responsive to said comparing means for comparing said net signal with a predetermined standard signal,
and means for producing a control signal if the net signal exceeds the predetermined standard signal.

2. The combination set forth in claim 1 wherein said means for producing a signal corresponding in magnitude to the no-load condition of the tool comprises an analog memory having an output corresponding to the no-load condition,
a summer for summing the signal from the analog memory and from the means for producing a load signal,
and a comparator for comparing the output of the summer and a reference signal.

3. The combination set forth in claim 1 including means for comparing said net signal to a second standard signal which is greater in magnitude than said first standard signal, and means responsive to said last mentioned comparing means for producing a second control signal when the net signal exceeds the predetermined standard.

4. The combination set forth in claim 3 including means responsive to said second control signal for actuating said means for moving the tool support to move the tool out of contact with the workpiece.

5. The combination set forth in claim 1 including means for producing a signal corresponding in magnitude to the rate of change of load on the tool, and means for comparing said rate of change signal with a predetermined standard signal, and means responsive to said last mentioned comparing means for producing a further control signal when said rate of change signal exceeds a predetermined standard.

6. The combination set forth in claim 5 including means responsive to said further control signal for operating said means for moving said tool support to move said tool out of contact with the workpiece.

7. The combination set forth in claim 1 wherein said means for producing a signal proportional to the no-load condition on said tool comprises an analog memory and a summer.

8. The combination set forth in claim 1 including means for comparing the net signal and the no-load signal with a predetermined nominal signal corresponding to the normal load on the tool.

9. The combination set forth in claim 8 wherein said last-mentioned means comprises an analog memory which produces a no-load signal, a summer, means for producing a nominal signal, said summer comparing said no-load signal, said load signal and said nominal signal to produce an output signal, and means for comparing said output signal with said predetermined standard.

10. The combination set forth in claim 9 including means for comparing said output signal with a second predetermined standard having a magnitude greater than said first predetermined standard, and means responsive to said last mentioned comparing means for producing a control signal when said output signal exceeds said second predetermined standard.

11. The combination set forth in claim 1 including means for producing a rate of change signal proportional to the rate of change of load on the tool and means for comparing said rate of change signal with a predetermined rate of change signal and producing an output signal when said rate of change signal exceeds said predetermined rate of change signal.

12. The combination set forth in claim 11 including means responsive to said last-mentioned signal for operating said means for moving said tool support relative to said workpiece in a direction to move said tool out of contact with said workpiece.

13. The combination set forth in claim 1 wherein said means for producing a no-load signal comprises an analog memory operable upon movement of said tool support in a direction to bring the tool out of contact with the workpiece, and a summer for summing said no-load signal and said instantaneous load signal, a second summer, means for producing a nominal load signal corresponding to the normal load on the tool, said second summer summing said output of said first summer and said nominal load signal, and means for comparing the output of said second summer and said nominal load signal, 14. The combination set forth in claim 13 including means for comparing said output of said summer with a predetermined standard signal of greater magnitude and producing an output signal when said output of said second summer exceeds the second predetermined standard signal.

15. The combination set forth in claim 14 including means responsive to said last-mentioned output signal for operating said means for moving said tool support in a direction to move said tool out of contact with said workpiece.

16. The combination set forth in claim 15 including means for producing a rate of change signal proportional to the rate of change of load on the tool and means for comparing said rate of change signal with a predetermined rate of change reference signal and producing a control signal in the event said rate of change signal exceeds said rate of change reference signal.

17. The combination set forth in claim 16 wherein said last-mentioned control signal is operable to actuate said means for moving said tool support in a direction to move said tool relatively away from said workpiece.

18. The combination set forth in claim 1 wherein said means for moving said tool is electrical, said first-mentioned means for producing a signal comprising a sensor for sensing the power supplied to said electrical means.

19. The combination set forth in claim 1 wherein said means for moving said tool is hydraulic, said first-mentioned means for producing a signal comprising a transducer responsive to the condition of fluid in said hydraulic means.

20. For use in a machine tool wherein a tool support is movable relative to a workpiece to perform work on the workpiece, the combination comprising means responsive to the load on the tool for producing a signal corresponding in magnitude to the no-load condition when the tool is out of contact with the workpiece, means responsive to the load on the tool for producing a signal corresponding in magnitude to the load on the tool when the tool is in contact with the workpiece, means responsive to said first and second mentioned signal producing means for producing a net signal equal to the difference between said load signal and said no-load signal, means responsive to said comparing means for comparing said net signal with a predetermined standard signal, and means for producing a control signal if the net signal exceeds the predetermined standard signal.

21. The combination set forth in claim 20 wherein said means for producing a signal corresponding in magnitude to the no-load condition of the tool comprises an analog memory having an output corresponding to the no-load condition, a summer for summing the signal from the analog memory and from the means for producing a load signal, and a comparator for comparing the output of the summer and a reference signal.

22. The combination set forth in claim 20 including means for comparing said net signal to a second standard signal which is greater in magnitude than said first standard signal, and means responsive to said last mentioned comparing means for producing a second control signal when the net signal exceeds the predetermined standard.

23. The combination set forth in claim 20 including means for producing a signal corresponding in magnitude to the rate of change of load on the tool, and means for comparing said rate of change signal with a predetermined standard signal,
and means responsive to said last mentioned comparing means for producing a further control signal when said rate of change signal exceeds a predetermined standard.

24. The combination set forth in claim 20 wherein said means for producing a signal proportional to the no-load condition on said tool comprises an analog memory and a summer.

25. The combination set forth in claim 20 including means for comparing the net signal and the no-load signal with a predetermined nominal signal corresponding to the normal load on the tool.

26. The combination set forth in claim 25 wherein said last-mentioned means comprises an analog memory which produces a no-load signal,
a summer,
means for producing a nominal signal,
said summer comparing said no-load signal, said load signal and said nominal signal to produce an output signal,
and means for comparing said output signal with said predetermined standard.

27. The combination set forth in claim 26 including means for comparing said output signal with a second predetermined standard having a magnitude greater than said first predetermined standard,
and means for producing a control signal when said output signal exceeds said second predetermined standard.

28. The combination set forth in claim 20 including means for producing a rate of change signal proportional to the rate of change of load on the tool and means for comparing said rate of change signal with a predetermined rate of change signal and producing an output signal when said rate of change signal exceeds said predetermined rate of change signal.

29. The combination set forth in claim 20 wherein said means for producing a no-load signal comprises an analog of memory operable upon movement of said tool support in a direction to bring the tool out of contact with the workpiece,
and a summer for summing said no-load signal and said instantaneous load signal,
a second summer,
means for producing a nominal load signal corresponding to the normal load on the tool,
said second summer summing said output of said first summer and said nominal load signal,
and means for comparing the output of said second summer and said first predetermined standard signal.

30. The combination set forth in claim 29 including means for comparing said output of said summer with a predetermined standard signal of greater magnitude and producing an output signal when said output of said second summer exceeds the second predetermined standard signal.

31. The combination set forth in claim 20 including means for producing a rate of change signal proportional to the rate of change of load on the tool and means for comparing said rate of change signal with a predetermined rate of change reference signal and producing a control signal in the event said rate of change signal exceeds said rate of change reference signal.

32. The combination set forth in claim 20 wherein said last-mentioned control signal is operable to actuate said means for moving said tool support in a direction to move said tool relatively away from said workpiece.

33. In a machine tool wherein a tool support is movable relative to a workpiece to perform work on the workpiece, the combination comprising
hydrostatic means for supporting the tool support for movement relative to the workpiece,
hydrostatic means for supporting a tool for rotation on said tool support,
means responsive to the load on the tool for producing a signal corresponding in magnitude to the no-torque condition when the tool is out of contact with the workpiece.
means responsive to the load on the tool for producing a signal corresponding in magnitude to the torque on the tool when the tool is in contact with the workpiece,
means responsive to said first and second mentioned signal producing means for producing a net signal equal to the difference between said torque signal and said no-torque signal,
means responsive to said comparing means for comparing said net signal with a predetermined standard signal,
and means for producing a control signal if the net signal exceeds the predetermined standard signal.

34. The combination set forth in claim 33 wherein said means for producing a signal corresponding in magnitude to the no-torque condition of the tool comprises an analog memory having an output corresponding to the no-torque condition,
a summer for summing the signal from the analog memory and from the means for producing a torque signal,
and a comparator for comparing the output of the summer and a reference signal.

35. The combination set forth in claim 33 including means for comparing said net signal to a second standard signal which is greater in magnitude than said first standard signal,
and means responsive to said last mentioned comparing means for producing a second control signal when the net signal exceeds the predetermined standard.

36. The combination set forth in claim 35 including means responsive to said second control signal for moving the tool support to move the tool out of contact with the workpiece.

37. The combination set forth in claim 33 including means for producing a signal corresponding in magnitude to the rate of change of torque on the tool,
and means for comparing said rate of change signal with a predetermined standard signal,
and means responsive to said last mentioned comparing means for producing a further control signal when said rate of change signal exceeds a predetermined standard.

38. The combination set forth in claim 37 including means responsive to said further control signal for moving said tool support to move said tool out of contact with the workpiece.

39. The combination set forth in claim 33 wherein said means for producing a signal proportional to the no-torque condition on said tool comprises an analog memory and a summer.

40. The combination set forth in claim 33 including means for comparing the net signal and the no-torque signal with a predetermined nominal signal corresponding to the normal torque on the tool.

41. The combination set forth in claim 40 wherein said last-mentioned means comprises an analog memory which produces a no-torque signal,
a summer,
means for producing a nominal signal,
said summer comparing said no-torque signal, said torque signal and said nominal signal to produce an output signal,
and means for comparing said output signal with said predetermined standard.

42. The combination set forth in claim 41 including means for comparing said output signal with a second predetermined standard having a magnitude greater than said first predetermined standard, and means responsive to said last-mentioned comparing means for producing a control signal when said output signal exceeds said second predetermined standard.

43. The combination set forth in claim 33 including means for producing a rate of change signal proportional to the rate of change of torque on the tool and means for comparing said rate of change signal with a predetermined rate of change signal and producing an output signal when said rate of change signal exceeds said predetermined rate of change signal.

44. The combination set forth in claim 43 including means responsive to said last-mentioned signal for moving said tool support relative to said workpiece in a direction to move said tool out of contact with said workpiece.

45. The combination set forth in claim 33 wherein said means for producing a no-torque signal comprises an analog memory operable upon movement of said tool support in a direction to bring the tool out of contact with the workpiece,
and a summer for summing said no-torque signal and said instantaneous torque signal,
a second summer,
means for producing a nominal torque signal corresponding to the normal torque on the tool,
said second summer summing said output of said first summer and said nominal torque signal,
and means for comparing the output of said second summer and said first predetermined standard signal.

46. The combination set forth in claim 45 including means for comparing said output of said summer with a predetermined standard signal of greater magnitude and producing an output signal when said output of said second summer exceeds the second predetermined standard signal.

47. The combination set forth in claim 46 including means responsive to said last-mentioned output signal for moving said tool support in a direction to move said tool out of contact with said workpiece.

48. The combination set forth in claim 33 including means for producing a rate of change signal proportional to the rate of change of torque on the tool and means for comparing said rate of change signal with a predetermined rate of change reference signal and producing a second control signal in the event said rate of change signal exceeds said rate of change reference signal.

49. The combination set forth in claim 48 further including means operable by said second control signal to move said tool support in a direction to move said tool relatively away from said workpiece.

References Cited

UNITED STATES PATENTS 3,259,023　7/1966　Rieger et al. _____ 77—32.7X

FRANCIS S. HUSAR, Primary Examiner

235—151.11; 318—39